Nov. 24, 1925.　　　　　　　　　　　　　　1,562,443
E. R. EVANS
VEHICLE BRAKE MECHANISM
Original Filed Sept. 4, 1923　　3 Sheets-Sheet 2
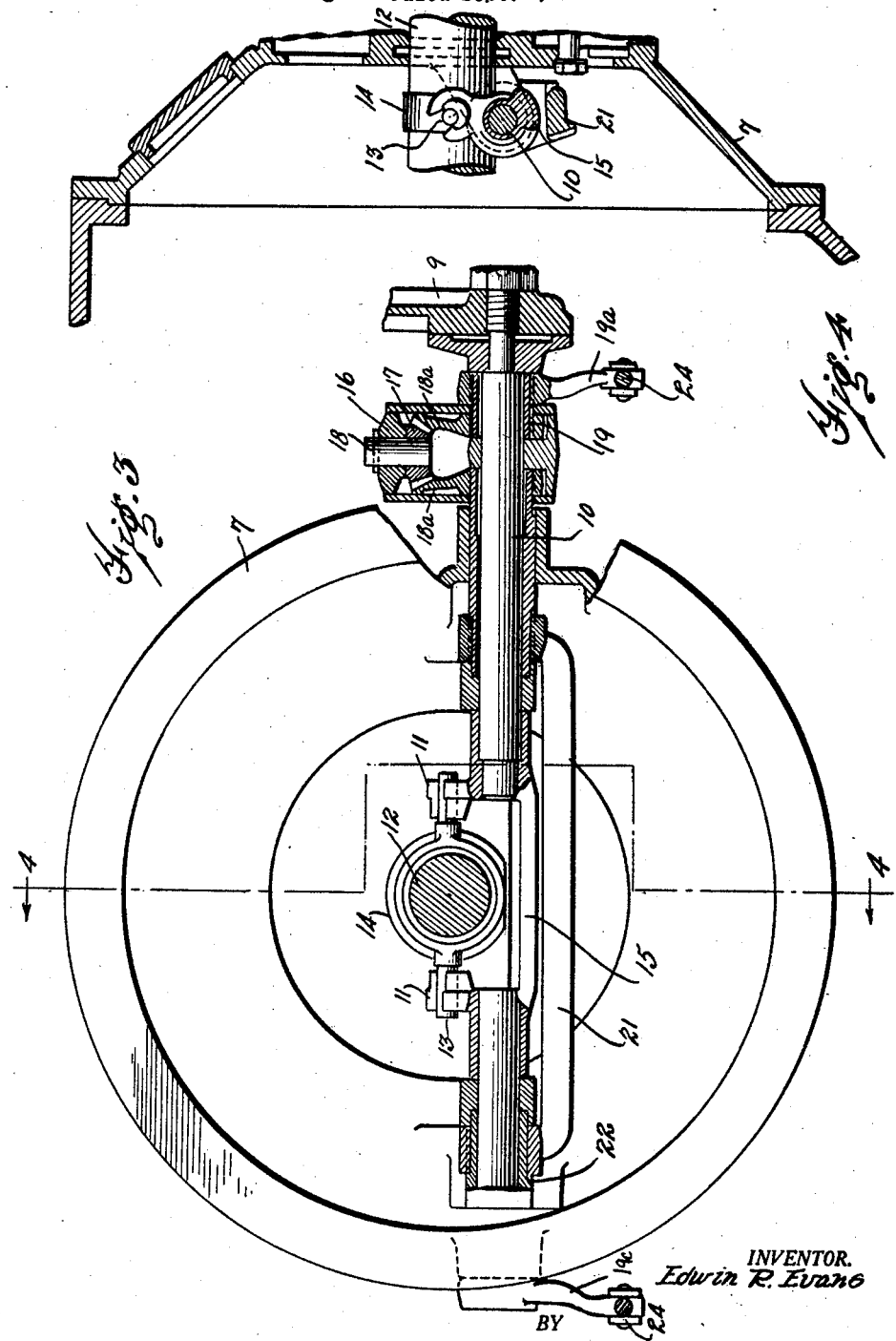
INVENTOR.
Edwin R. Evans
BY
Whittemore, Hulbert, Whittemore, & Belknap
ATTORNEYS Nov. 24, 1925.
E. R. EVANS
1,562,443
VEHICLE BRAKE MECHANISM
Original Filed Sept. 4, 1923   3 Sheets-Sheet 3
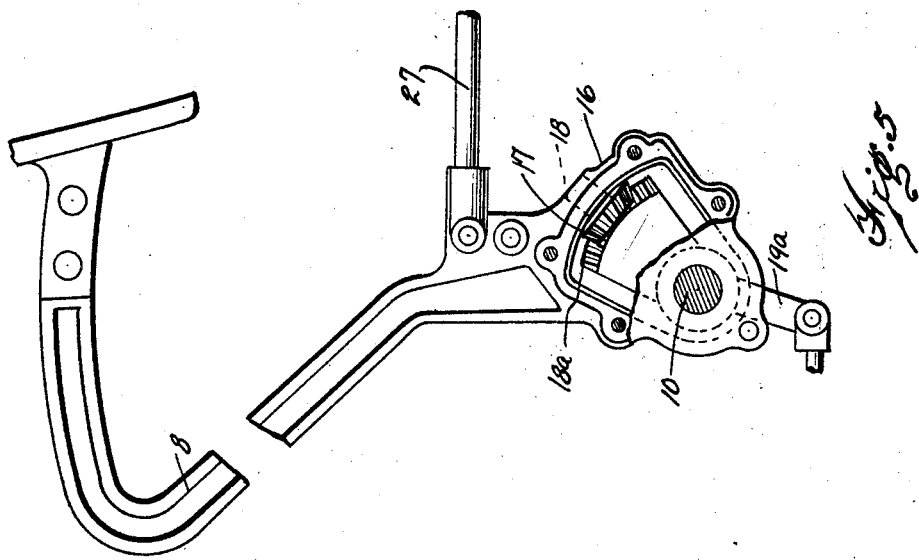
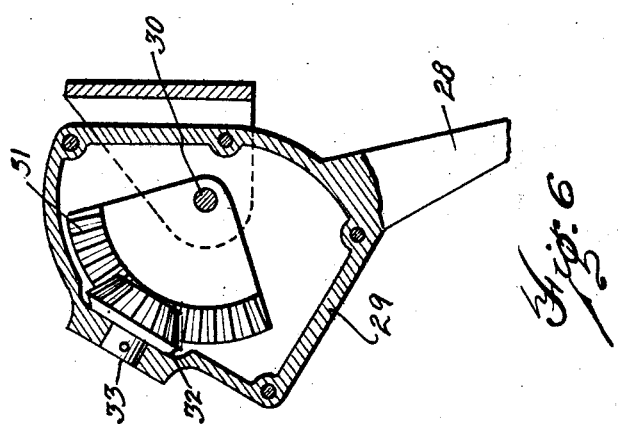
INVENTOR.
Edwin R. Evans
BY
Whittemore, Hulbert, Whittemore & Belknap
ATTORNEYS Patented Nov. 24, 1925.

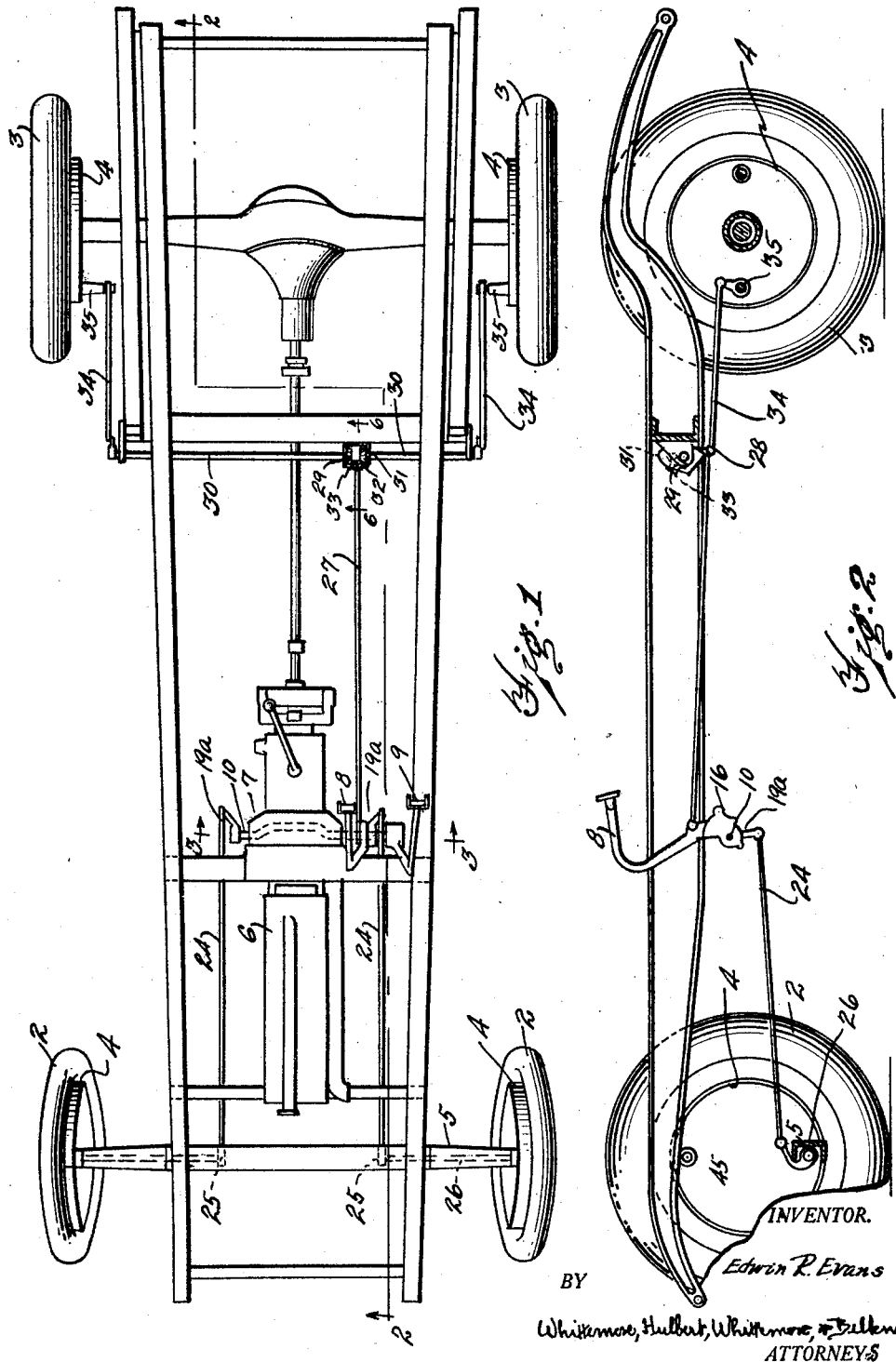

1,562,443

UNITED STATES PATENT OFFICE.

EDWIN R. EVANS, OF DETROIT, MICHIGAN.

VEHICLE BRAKE MECHANISM.

Original application filed September 4, 1923, Serial No. 660,855. Divided and this application filed May 5, 1924. Serial No. 711,279.

*To all whom it may concern:*

Be it known that I, EDWIN R. EVANS, a citizen of the United States of America, residing at Detroit, in the county of Wayne and State of Michigan, have invented certain new and useful Improvements in Vehicle Brake Mechanisms, of which the following is a specification, reference being had therein to the accompanying drawings.

This invention relates to vehicle brake mechanisms and particularly relates to mechanisms including both front and rear wheel brakes. This application is a division of copending application Serial Number 660,855, filed Sept. 4, 1923.

The invention consists primarily in a novel relation between the brake control and clutch control mechanisms.

In the drawings:

Figure 1 is a plan view of a vehicle chassis equipped with the improved brake mechanism;

Figure 2 is a sectional view of the same on line 2—2 of Figure 1;

Figure 3 is a cross section on line 3—3 of Figure 1 showing the relation of the clutch control and the brake control mechanisms;

Figure 4 is a vertical sectional view of the same on line 4—4 of Figure 3;

Figure 5 is a section on line 5—5 of Figure 3 showing primarily the brake control pedal and connected parts;

Figure 6 is a detailed sectional view taken upon line 6—6 of Figure 1 showing mechanism for equalizing the braking force transmitted to the two rear wheels.

In these views, the reference character 1 designates the frame of a motor vehicle and 2 and 3 the front and back wheels thereof, each of said wheels being provided with a brake drum 4. 5 is the front axle, 6 the engine, 7 the clutch housing, 8 the brake control pedal and 9 the clutch control pedal. The pedal 9 is mounted fast upon one end of a rock shaft 10 which is mounted in the clutch housing 7 and within said housing carries a pair of lugs 11 upstanding at opposite sides of the transmission shaft 12 to engage trunnions 13 upon the clutch release collar 14. Preferably the shaft 10 comprises portions at opposite sides of the transmission shaft 12 and rigidly connected by a yoke member 15 which is downwardly offset to clear the shaft 12 and collar 14. The lower end portion of the brake control pedal 8 forms a casing 16 which is journaled upon the shaft 10 between the clutch pedal lever 9 and the housing 7. Within said casing, a bevelled pinion 17 is journalled upon a stub shaft 18 carried by said casing in a radial relation to the shaft 10. Said pinion is oppositely engaged, within said casing, by segmental bevel gears 18ª, one of which is fast upon a short tubular shaft 19 journaled upon the shaft 10 exteriorly of the housing 7, one of the front brake control levers 19ª also being fast upon said tubular shaft. The other gear 18ª is fast upon a longer tubular shaft 20 also journaled upon the shaft 10 and extending into said housing. A yoke bar 21, offset downwardly below the yoke 15 rigidly connects the shaft 20 with a tubular shaft 22 journaled upon the shaft 10 at the opposite side of the transmission shaft 12, said shaft 22 projecting exteriorly of the casing 7 to mount the other front brake control lever 19ª. The levers 19ª are pivotally engaged by rods 24 which extend forwardly to pivotally engage arms 25 upon the cam shafts 26 of the front wheel brakes. The brake control foot lever 8 is adapted to actuate the rear brakes through a pull rod 27 pivoted to said lever just above the gear casing 16. Said rod extends rearwardly to engage an arm 28 integrally depending from a casing 29 journaled upon the adjacent ends of the frame 1. Within the casing 29, the shafts 30 rigidly carry gear segments 31 which mesh with a bevel pinion 32 journaled between said segments upon a stud shaft 33 carried by the casing 29. The outer ends of the rock shafts 30 are respectively connected by pull rods 34 to the cam shafts 35 of the rear brakes.

Considering now the operation of the invention as so far described, upon actuation of the foot lever 8, the resultant rocking of the casing 16, rigidly carried by the lower end of said lever, causes the pinion 17, carried by said casing to form through its engagement with the gear segments 18ª a means for subjecting said segments to an equalized rocking movement. As is well understood, the pinion 17 will adjust itself relative to the segments 18ª so as to equalize the effort transmitted through each of said segments. This equalized effort is transmitted from said segments through the pull rods 24 to the front brakes. The concentric mounting of the brake shafts 20 and the clutch shaft 10 simplifies the mechanism and further produces a compact unit assembly for the main clutch and brake rock shafts. This assembly is made possible primarily by employment of the offset connections 15 and 21 between the portions of said shafts at opposite sides of the engine shaft.

Equalization of the braking effect acting upon the two front wheels and a similar equalization as regards the rear brakes is assured by the gearings 17, 18ª and 31, 32.

What I claim as my invention is:—

1. The combination with a vehicle drive shaft, of coaxial clutch control shafts at opposite sides of said drive shaft, a drive connection between said shafts offset transversely to their axis to clear the engine shaft, a pair of brake actuating elements mounted coaxially with said clutch control shafts at each side of said drive shaft, and a similarly offset connection between said brake control members.

2. The combination with a vehicle drive shaft, of clutch control shafts extending at opposite sides of said drive shaft, a drive connection between said shafts offset to clear said engine shaft, tubular brake control shafts journaled upon said clutch control shafts, and a similarly offset drive connection between said tubular shafts.

3. In a clutch control mechanism a casing, a vehicle drive shaft within the casing, a pair of aligned brake control shafts transverse to said drive shaft and lying within the casing at opposite sides of the drive shaft, and a drive connection within the casing between said aligned shafts offset to clear said drive shaft.

4. The combination with a vehicle having a clutch casing, of a brake control shaft mounted within the casing, brake control levers mounted at opposite sides of said casing for connection to different brakes of the vehicle, means for applying braking effort to the brake control shaft for actuating one of said levers, and means extending transversely of the casing and therewithin for transmitting a braking effort from the said brake control shaft to the other of said levers.

5. The combination with a clutch casing and a clutch control shaft, of a tubular brake control shaft embracing the control shaft at one side of the casing, a second control shaft axially aligned with the clutch control shaft and provided with a portion extending outside the casing at the other side thereof, and connecting means within the casing for transmitting a braking force from the first said brake control shaft to the second said brake control shaft.

6. In a brake mechanism, the combination with a casing, of a pair of clutch control shafts housed in opposite sides of the casing respectively, a brake control shaft embracing each clutch control shaft, each brake control shaft having a portion provided outwardly from said casing, means for actuating the clutch control shafts independently of the brake control shafts, and a brake control mechanism and a clutch control mechanism independently actuable by one of said clutch control shafts and brake control shafts respectively.

7. The combination with a clutch casing, of a brake control mechanism including a brake control shaft mounted within said casing and having a portion projecting outside the casing at one side thereof, means for applying a braking force to the said outwardly projecting portion of said brake control shaft, a brake control lever, means for pivotally mounting said lever on the opposite side of said casing from that aforesaid, and means for transmitting the braking force from the portion of the brake control shaft positioned within the casing to the said brake control lever.

8. The combination with a clutch casing, of a brake control mechanism including a brake control shaft mounted within said casing and having a portion projecting outside the casing at one side thereof, means for applying a braking force to the said outwardly projecting portion of said brake control shaft, a brake control lever, means for pivotally mounting said lever on the opposite side of said casing from that aforesaid, and means for transmitting the braking force from the portion of the brake control shaft positioned within the casing to the said brake control lever, a second brake control lever carried by the said outwardly projecting portion of said brake control shaft and actuated by the said braking force applying means.

9. The combination with a clutch casing and an engine drive shaft extending therethrough, of a brake control mechanism comprising a brake control shaft mounted within said casing at one side thereof, and having a portion projecting outside the casing at one side thereof, means for applying a braking force to the said outwardly projecting portion of the brake control shaft, a second control shaft axially aligned with the said brake control shaft and provided with a portion projecting outwardly of the casing at the other side from that aforesaid, a connection between the inner ends of said control shafts offset transversely of the said engine drive shaft, and a brake control lever carried by the outwardly projecting portion of one of said control shafts.

10. In a clutch mechanism, a casing, a pair of aligned brake control shafts lying within the casing, each having a portion extending oppositely outside the casing and a driving connection within the casing between said aligned shafts.

11. In a clutch mechanism, a casing, a pair of aligned brake control shafts lying within the casing, each having a portion extending oppositely outside the casing and a driving connection within the casing between said aligned shafts, a brake control lever carried by one of said extended portions and a brake actuating member connected for actuating the other of said extended portions.

In testimony whereof I affix my signature.

EDWIN R. EVANS.